(12) United States Patent
Tan

(10) Patent No.: US 11,568,465 B2
(45) Date of Patent: Jan. 31, 2023

(54) INTELLIGENT ONLINE PLATFORM FOR DIGITIZING, SEARCHING, AND PROVIDING SERVICES

(71) Applicant: Wenye Tan, Arlington, VA (US)

(72) Inventor: Wenye Tan, Arlington, VA (US)

( * ) Notice: Subject to any disclaimer, the term of this patent is extended or adjusted under 35 U.S.C. 154(b) by 0 days.

(21) Appl. No.: 17/239,681

(22) Filed: Apr. 25, 2021

(65) Prior Publication Data

US 2022/0343388 A1   Oct. 27, 2022

(51) Int. Cl.
*G06Q 30/06* (2012.01)
*G06F 3/0482* (2013.01)
*G06F 16/9538* (2019.01)

(52) U.S. Cl.
CPC ....... *G06Q 30/0627* (2013.01); *G06F 3/0482* (2013.01); *G06F 16/9538* (2019.01)

(58) Field of Classification Search
CPC ................................. G06Q 30/0627
See application file for complete search history.

(56) References Cited

U.S. PATENT DOCUMENTS

| 2004/0167897 A1* | 8/2004 | Kuhlmann | G06F 16/2465 |
| 2016/0283998 A1* | 9/2016 | Pathak | G06Q 30/0627 |
| 2021/0174419 A1* | 6/2021 | Van De Woestyne | G06Q 30/0284 |

* cited by examiner

*Primary Examiner* — Roland J Casillas

(57) ABSTRACT

A method for an online service provision platform includes establishing a service product database containing a plurality of digitized service products, obtaining a search term from a user, and searching the service product database based on the search term to obtain a plurality of candidate service products. Each digital service product corresponds to a service item identifier, and the service item identifier uniquely identifies a service item and contains a plurality of fields including a category field, one or more sub-category fields, and a service item field. The method also includes displaying the candidate service products to the user to obtain a selected service product chosen from the candidate service products by the user, and performing a service provision process of the selected service product.

17 Claims, 5 Drawing Sheets

400
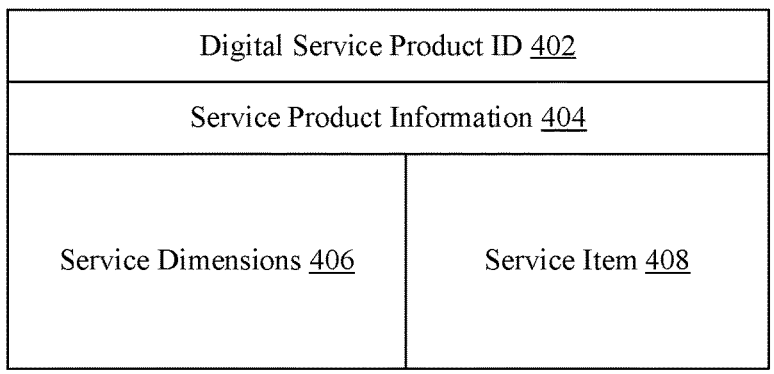
FIG. 4
408
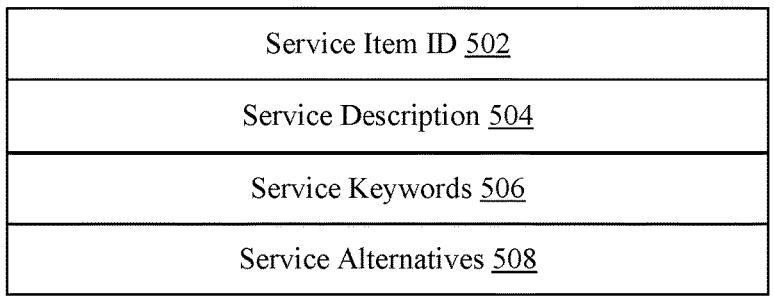
FIG. 5A
502
| Category | Sub-category [n] | ... | Sub-category [n] | Service item | Service sub-item[0] | ... | Service sub-item[m] |
|---|---|---|---|---|---|---|---|
| Category field 512 | Sub-category field 514 | | | Service item field 516 | Service sub-item field 518 | | |
FIG. 5B

INTELLIGENT ONLINE PLATFORM FOR DIGITIZING, SEARCHING, AND PROVIDING SERVICES

FIELD OF THE INVENTION

The present disclosure relates to e-commerce technologies and, more particularly, to methods and systems for providing an intelligent online platform for digitizing, searching, and providing services.

BACKGROUND

A tangible goods can be easily described, quantified, and sold on an e-commerce platform. In this sense, the e-commerce platform hosts the digitized merchandises, and all the merchandises can exist in a digital format to be viewed, searched, and purchased by an online customer, and the actual merchandises can be delivered to the customer in the real world. In other words, for computers, it is relatively easy to manage data objects representing the merchandises, and to achieve inputting, storing, searching, and/or retrieving tangible merchandises.

However, services, especially legal services, are not like tangible goods. Services are often personalized/customized to a certain degree, and it is often difficult to define services in a standard way. That is, it is relatively difficult to create and manage data objects representing the services to achieve inputting, storing, searching, and/or providing services online. The disclosed method and system are directed to solve one or more problems set forth above and other problems.

BRIEF SUMMARY OF THE DISCLOSURE

One aspect of the present disclosure provides a method for an online service provision platform. The method includes establishing a service product database containing a plurality of digitized service products, obtaining a search term from a user, and searching the service product database based on the search term to obtain a plurality of candidate service products. Each digital service product corresponds to a service item identifier, and the service item identifier uniquely identifies a service item and contains a plurality of fields including a category field, one or more sub-category fields, and a service item field. The method also includes displaying the candidate service products to the user to obtain a selected service product chosen from the candidate service products by the user, and performing a service provision process of the selected service product.

Another aspect of the present disclosure provides a non-transitory computer-readable storage medium containing computer-executable instructions for, when executed by one or more processors, performing a method for an online service provision platform containing a server and a plurality of terminals. The method includes establishing a service product database containing a plurality of digitized service products, obtaining a search term from a user, and searching the service product database based on the search term to obtain a plurality of candidate service products. Each digital service product corresponds to a service item identifier, and the service item identifier uniquely identifies a service item and contains a plurality of fields including a category field, one or more sub-category fields, and a service item field. The method also includes displaying the candidate service products to the user to obtain a selected service product chosen from the candidate service products by the user, and performing a service provision process of the selected service product.

Another aspect of the present disclosure provides a system for an online service provision platform. The system includes one or more processors, configured to, in response to computer-executable instructions: establish a service product database containing a plurality of digitized service products, each digital service product corresponding to a service item identifier, and the service item identifier uniquely identifying a service item and contains a plurality of fields including a category field, one or more sub-category fields, and a service item field; obtain a search term from a user; search the service product database based on the search term to obtain a plurality of candidate service products; display the candidate service products to the user to obtain a selected service product chosen from the candidate service products by the user; and perform a service provision process of the selected service product.

Other aspects of the present disclosure can be understood by those skilled in the art in light of the description, the claims, and the drawings of the present disclosure.

BRIEF DESCRIPTION OF THE DRAWINGS

FIG. 4 illustrates an exemplary digital service product consistent with the disclosed embodiments;

FIG. 5A illustrates an exemplary service item consistent with the disclosed embodiments;

FIG. 5B illustrates an exemplary service item ID data structure consistent with the disclosed embodiments.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts. Further, the described embodiments are some but not all of the embodiments of the present invention. Based on the disclosed embodiments, persons of ordinary skill in the art may derive other embodiments consistent with the present disclosure, all of which are within the scope of the present invention.

In the present disclosure, a user terminal, a terminal, or a terminal device is used interchangeably to refer to any computing device that may communicate with another computing device. Exemplary terminals may include laptop computers, smartphones, tablet computers, etc. A mobile terminal may refer to any computing device that includes a wireless communication module to provide mobility, such as a smartphone, a pad, a smart appliance, a personal digital assistant (PDA), etc.

Figure 1:
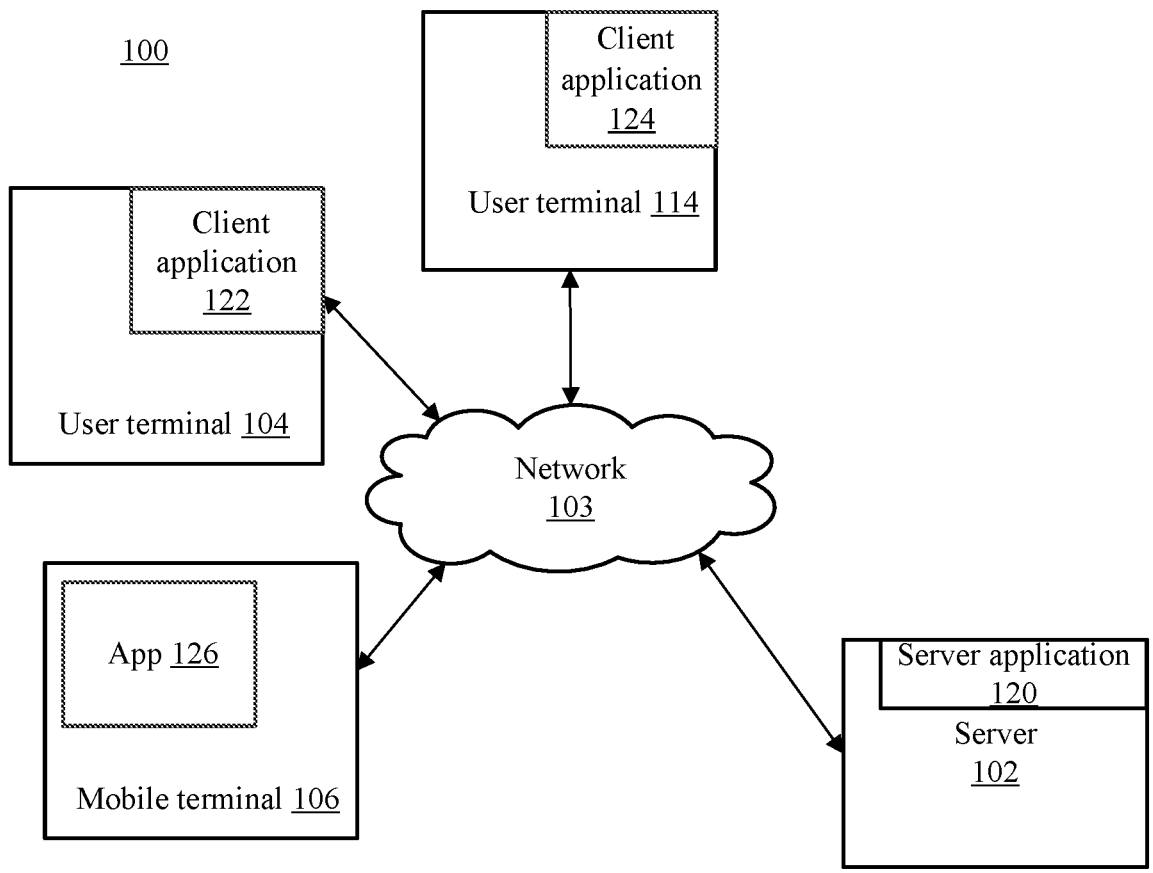
FIG. 1 illustrates an exemplary online computer environment incorporating certain disclosed embodiments.

FIG. 1 illustrates an exemplary online computer environment 100 incorporating certain disclosed embodiments. As shown in FIG. 1, online computer environment (system) 100 may include a user terminal 104, a mobile terminal 106, and a user terminal 114, a network 103, and a server 102. Other components may also be included.

The network 103 may include any appropriate type of communication network for providing network connections to the user terminals 104 and 114, mobile terminal 106, and the server 102. For example, network 103 may include the Internet, LAN (Local Area Network), or other types of computer networks or telecommunication networks, either wired or wireless.

Server 102, as used herein, may refer to one or more server computers configured to provide certain server functionalities, such as storing or processing data related to users, user online activities, user applications, and user terminal data flows and data patterns, etc. For example, the server 102 may authenticate any user accessing the services provided by the server 102. The server 102 may also include one or more processors to execute computer programs. Although only one server is shown, any number of servers can be included. The server 102 may operate in a cloud or non-cloud computing environment.

User terminals 104 and 114 may include any appropriate type of network computing devices, such as PCs, tablet computers, smartphones, network TVs, etc. The mobile terminal 106 may include any appropriate type of computing device having a wireless communication module to provide mobility functionalities, such as television sets, smart appliances, and other Tot (internet of things) devices.

The various terminals (user terminals 104 and 114, mobile terminal 106) may also include various applications, such as email, social network chat rooms, web browsing, online searching, etc. Specifically, terminals 104, 114, and 106 may include a service access application (e.g., client application 122 and 124 or App 126). The service access application, as used herein, may include any appropriate software application, hardware application, or a combination thereof to achieve certain client functionalities for providing access to various services, especially legal services. For example, the service access application may be a service marketplace application, a virtual assistant application or any other appropriate application running on the user terminal to facilitate a user to search, obtain, post, and/or otherwise access services available to the user. Although only three terminals are shown in FIG. 1, any number of terminals may be included in the environment 100.

Figure 2:
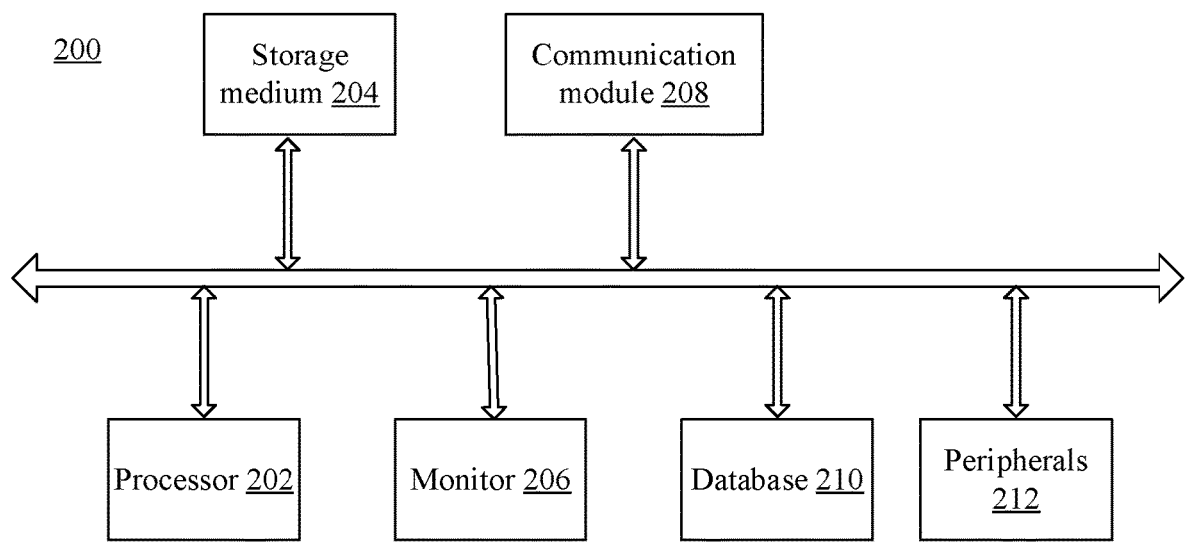
FIG. 2 illustrates a block diagram of an exemplary computer system consistent with the disclosed embodiments.

The user terminal 104 or 114, the mobile terminal 106, and/or the server 102 may be implemented on any appropriate computing platform. FIG. 2 illustrates a block diagram of an exemplary computer system 200 capable of implementing user terminal 104 or 114 and/or the server 102.

As shown in FIG. 2, computer system 200 may include a hardware processor 202, storage medium 204, a monitor 206, a communication module 208, a database 210, and peripherals 212. Certain devices may be omitted, and other devices may be included.

Processor 202 may include any appropriate processor or processors. Further, processor 202 can include multiple cores for multi-thread or parallel processing. Storage medium 204 may include memory modules, such as Read-only Memory (ROM), Random Access Memory (RAM), flash memory modules, and erasable and rewritable memory, and mass storages, such as CD-ROM, U-disk, and hard disk, etc. Storage medium 204 may store computer programs for implementing various processes, when executed by processor 202. Monitor 206 may include any appropriate display for displaying data processed by the processor 202, such as an LCD display screen or a touch screen, etc.

Further, peripherals 212 may include I/O devices such as a keyboard and a mouse. Communication module 208 may include network devices for establishing connections through the network 103. Database 210 may include one or more databases for storing certain data and for performing certain operations on the stored data, such as database searching and analysis.

Figure 3:
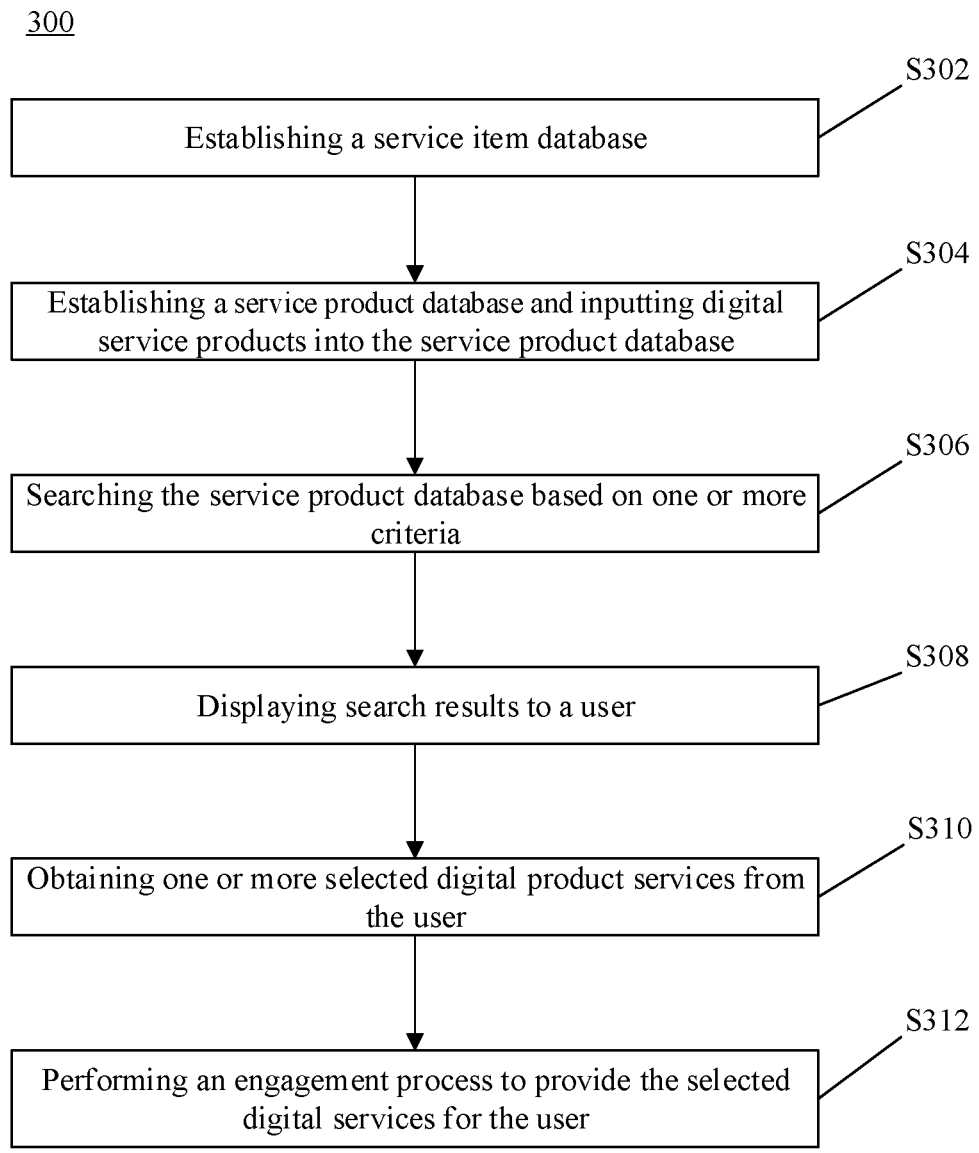
FIG. 3 illustrates an exemplary service provision process consistent with the disclosed embodiments.

In operation, returning to FIG. 1, the server 102 and user terminals may interact with one another to perform various processes for providing service access functionalities. To implement these processes, the server 102 may include a server application 120, which may interact with client applications 122 and 124 or App 126 on terminals 104, 114, and 106. A client application may communicate with the server application or may communicate with another client application to implement the processes on the corresponding terminal for service provision. FIG. 3 illustrates an exemplary service provision process consistent with disclosed embodiments of the present disclosure.

The service provision process includes any process that may be used to define, create, and/or provide digital service products over the Internet. As used herein, a digital service product may refer to a specific product of a corresponding digital service, which is referred to as a service item. That is, a service item may refer to a service in a general sense, i.e., a generally defined service without considering specifics such as the service provider or other information. Thus, a digital service product is a specific embodiment of a service item, and includes both information about the service item as well as a plurality of portions of information to completely describe the digital service product for the purpose of providing the corresponding service to the user.

For example, a service may refer to a real world service, such as preparing a will for a user as in the legal industry, or performing a diagnostic as in the medical industry, etc. The service may be digitized such that the service can be represented in the digital world as implemented by computers and software programs, and such digitized service may also be called a digital service, which is a digital representation of the corresponding service. At the same time, the digital service product is an embodiment of the corresponding service, with sufficient product details such that a user can consider, select, and/or obtain the corresponding service. For the sake of convenience, a service product and a service may be used interchangeably in the subsequent descriptions. FIG. 4 illustrates an exemplary digital service product consistent with disclosed embodiments of the present disclosure.

As shown in FIG. 4, a digital service product 400 may include a digital service product identifier 402, service information 404, a plurality of service dimensions 406, and a service item 408. Certain parts may be omitted and other parts may be included. The digital service product ID 402 may be an identifier to uniquely identify the digital service product 400, such as a stock keeping unit (SKU) number, a bar code, or a two-dimensional bar code, etc. Service product information 404 may include additional information to describe the digital service product 400. Further, a plurality of service dimensions 406 may be included in the digital service product 400. That is, the service dimensions 406 may provide the specific details to provide the user a specific embodiment of the corresponding service, and each service dimension may specify a specific aspect of the digital service product. The service item 408 may describe and identify a corresponding service of the digital service product 400. To more specifically illustrates the above concepts of the service item and digital service product, legal services are used in the following descriptions as examples.

For example, to define a legal service product on an e-commerce platform, i.e., to digitize a particular legal service, the corresponding legal service item as well as multiple legal service dimensions are used. As the service item defines a piece of general legal service, the dimensions are used to add particularity to the general legal service to define a legal service product, which is used as a self-contained entity for many purposes on the e-commerce platform. That is, a digital legal service product or simply legal service product is an embodiment of a legal service, i.e., the actual legal service product that can be ordered and delivered. The legal service product can be identified by a service product identifier for product identification and inventory tracking, just like a tangible product.

Further, the legal service product may include a plurality of service dimensions. For example, a service provider dimension may be included to indicate detail information of the service provider for providing the corresponding legal service represented by the service item. When the service provider is an attorney, the provider dimension may contain information about the attorney, such as the name, the credential, the experience, a picture of the attorney, and/or other similar information. When the service provider is a law firm or an organization, the provider dimension may contain information about the law firm or the organization, such as name, firm description, experience, and/or other similar information.

Further, the legal service product may also include a service scope dimension. The service scope dimension may define a specific scope, degree, or type of the service to modify the corresponding service represented by the service item. For example, the service scope dimension may include a range of the service (e.g., whether it is a full service, a self-service, a self-service with advising, legal documents preparation, opinion letter or attorney letter only, counseling only, a degree of difficulty of the service, etc.).

The legal service product may also include a time dimension. The time dimension may define time related features of the corresponding service represented by the service item. For example, the time dimension may include an available time (i.e., when the service is available), a time duration (i.e., how long to complete the service), a billing time amount (i.e., how much time is going to be billed for the service), a complete time (i.e., when the service is completed), etc. Other time information may also be included.

The legal service product may also include a location dimension. The location dimension may define location related features of the corresponding service represented by the service item. The location dimension may include a location or locations of the service provider (e.g., the state or states, county or counties, city or cities of the service provider), a location or locations of the user (e.g., the state or states, county or counties, city or cities of the user), a location or locations of the issue or subject of the service (e.g., the state or states, county or counties, city or cities of the action or dispute that is the subject of the legal service to be requested). Other location information may also be included.

The legal service product may also include a cost or fee dimension. The fee dimension may define fee related features of the corresponding service represented by the service item. For example, the fee dimension may include a fee type (hourly fee, fixed fee, contingent fee, etc.), a fee rate, a fee amount, a discount rate, a fee payment date, and an interest rate, etc.

The legal service product may also include a delivery dimension. The delivery dimension may define delivery related features of the corresponding service represented by the service item. For example, the delivery dimension may include a delivery location, a delivery method, a delivery person, a delivery requirement, and other delivery related information.

The legal service product may also include a review dimension. The review dimension may define review related features of the corresponding service represented by the service item. Other dimension may also be included. For example, the review dimension may include a review ranking score, a total number of reviews received, review comments, reviewer information, and other review information related to the corresponding service or to the service provider, etc. The review ranking score may be a customer review ranking score and/or a platform review ranking score. Other dimensions may also be included.

Returning to FIG. 4, the various service dimensions 406 are used to define specific features of the service item 408. FIG. 5A illustrates an exemplary service item 408 consistent with disclosed embodiments of the present disclosure.

As shown in FIG. 5A, the service item 408 may include a service item identifier 502, a service description 504, service keywords 506, and service alternatives 508. Certain parts may be omitted and other parts may be included.

The service item ID 502 may be a unique identifier to identify a service item. The service description 504 may include a short description and/or a long description of the service. The service keywords 506 may include one or more keywords for relating to the service item. The service alternative 508 may include one or more services or suggestions that are alternatives to the service item for various purposes, such as unavailability or upgrade/downgrade.

In certain embodiments, the service item ID 502 may contain a series identifiers or numbers to specifically identify the service item. For example, the service item ID 502 may include a service category, one or more service sub-categories, a service item, and one or more service sub-item, etc. The service category may define a specific category for the service item, such as an estate planning service, an intellectual property (IP) service, etc. The service sub-category may define a specific sub-category for the service item. For example, if the service category is an IP service, the sub-category may be a patent service, a trademark service, a copyright service, etc. Further, more than one sub-categories may be included, i.e., a sub-category can have its own sub-category or sub-categories. In the above example, for the patent service sub-category, it may also include a sub-category of preparing and filing patent applications, and a sub-category of responding to office actions, etc.

Further, following the category and one or more sub-categories, the service item may define a single service item under the category and sub-category. In the above example, under the IP service category, the patent service sub-category, and the sub-category of preparing and filing patent applications, the service item may be drafting a utility patent application. In certain embodiments, there may also be sub-items of the service item to further define a portion of the service item.

Thus, the service item ID 502 may be represented by a data structure having a plurality of fields. FIG. 5B shows an exemplary service item ID data structure consistent with the disclosed embodiments. As shown in FIG. 5B, the service item ID 502 may include a category field 512, a sub-category field 514, a service item field 516, and a service sub-item field 518. Other fields may also be included. The category field 512 may indicate a category of the service item ID; the sub-category field 514 may include one or more sub-categories [0] . . . [n], n is an integer; the service item field 516 may indicate the service item of the service item ID; and the service sub-item field 518 may include one or more service sub-items [0] . . . [m], m is an integer. Thus, the service items ID may be presented as category.sub-category [n].service item.sub-item[m], and n, m are integers with value of 0, 1, or greater than 1. By digitizing the service item ID in such data structure, searching and referencing the service items by computer systems may be substantially improved.

In certain embodiments, the service item ID 502 may be represented by a digital number of certain bit-length, with various bits respectfully representing the category, the sub-category, the service item, and the sub-item, e etc. For example, a 64 bit number may be used to represent the service item ID 502. In one example, among the 64 bits, the category is 8 bits (1 byte), 3 sub-categories each is 8 bits, the service item is 16 bits, and 2 sub-items each is 8 bits. Thus, a 64-bit service item ID of 131.1.0.0.12.0.0 may indicate that the category is 131, the only one sub-category is 1 (other two sub-categories are 0), the service item is 12, and no sub-item (two sub-items are 0). Of course, other arrangements may also be used.

Returning to FIG. 5A, the service item ID 502 may be used to search any particular service or services in a service database. The service alternative 508 may include one or more service item IDs as alternative service items or upgrade service items. That is, the service alternative 508 may include one or more service items each with a respectively status as to whether the service item is an alternative service item or an upgrade service item, or other type of alternativeness.

Returning to FIG. 3, the server 102 and/or terminals may implement the service provision process 300 to create and provide digitized services. That is, a server application from the server 102 may interact with a client application of a user terminal to implement an online ecommerce platform for providing digitized services. For example, the user of the user terminal may search and/or obtain a digitized service through a user interface of the ecommerce platform.

As shown in FIG. 3, at the beginning of the service provision process 300, a service item database may be established (S302). That is, the server 102 may create a data base for all available service items. For example, the server 102 may create the service item database and upload a pre-stored service item file into the service item database to input the pre-stored service items in the file. The server 102 may also obtain one or more service item files from a user of the server 102 to input the service items in the files inputted by the user. In addition, the server 102 may also obtain service items in real time. For example, when a user of the terminal request to search or input a service item that is not yet in the service item database, the server 102 may dynamically create the requested service item and input the service item in the service item database.

Further, the server 102 may create a service database and input digital services into the service database (S304). That is, the server 102 may create a service product database to contain all service products, such as available service products, unavailable service products, and future service products. The server 102 may input the service products based on a pre-stored data file, or a data file inputted by the user. The server 102 may also input a service product into the service database in real time. For example, when a service provider tries to list a service product that is not found in the current service database, the server 102 may input the new service product into the service database dynamically such that the service provider can list the service product.

When inputting a service product into the service database, the server 102 may first obtain the corresponding service item of the service product, and may search the service item in the service item database. If the server 102 cannot find the corresponding service item in the service item database, the server 102 may input the corresponding service item into the service item database, and then input the service product into the service product database.

Figure 6:
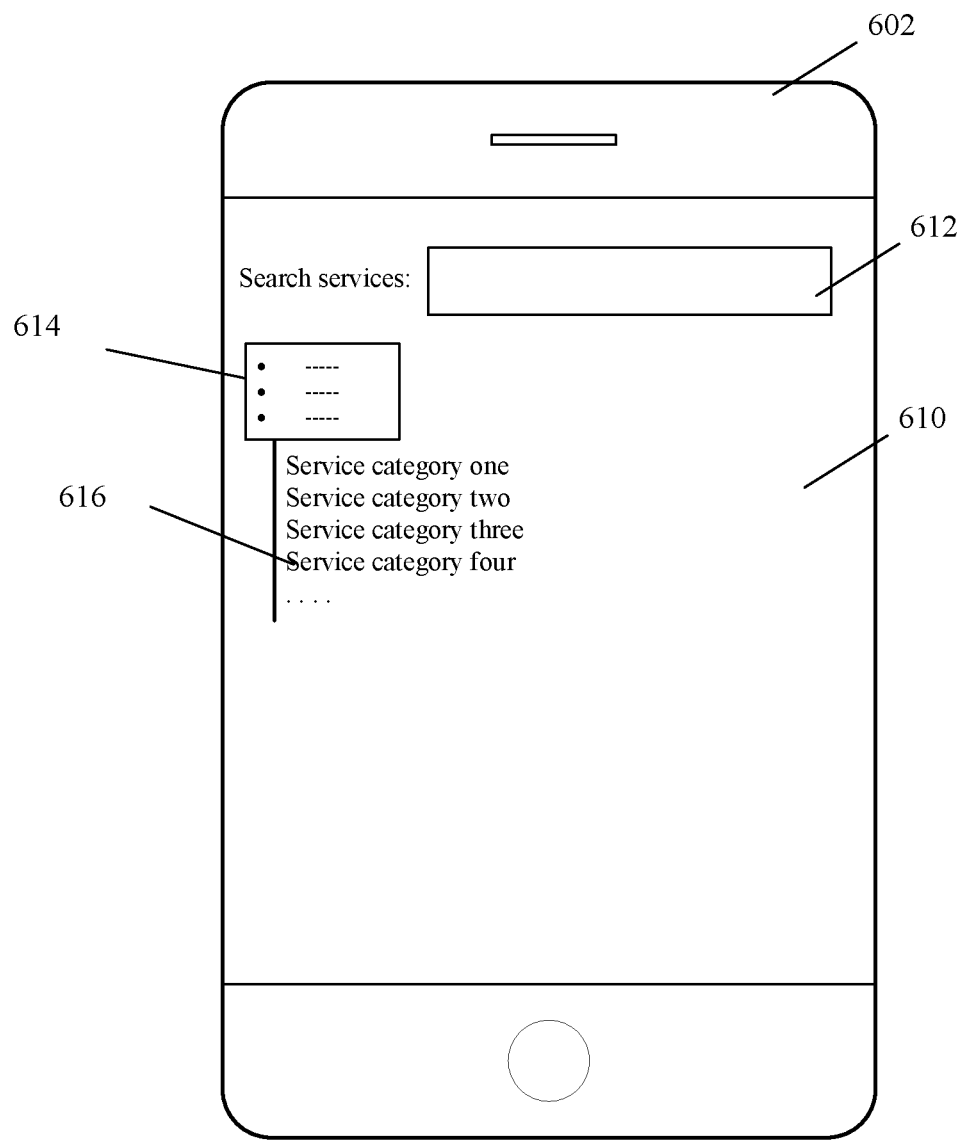
FIG. 6 illustrates an exemplary user interface consistent with the disclosed embodiments.

After the service database is established and populated, a user terminal may search the service database based on one or more criteria (S306). For example, a user of the user terminal may want to obtain a service on the ecommerce or online platform provided by the server 102, and the user may first search the service via the user interface on the user terminal connected to the server 102. FIG. 6 illustrates an user interface used by the user to search the service consistent with the disclosed embodiments.

As shown in FIG. 6, a user terminal 602 may include a user interface 610 for access the ecommerce platform provided by the server 102. The user interface 610 may be a webpage or an App (i.e., application) interface, and the user may input one or more search terms for the server 102 to search the service product database. The user interface 610 may include a text input box 612, and a service category drop down menu 614, etc. The which may include a list of service categories 6116. Of course, other controls may also be included.

The user may input the search term and search the service database in different ways. For example, The user may enter a search keyword in the test input box 612 with the prompt of "search services", and the server 102 may obtain the inputted keyword as the search term and search the service database. When using the keyword to perform the search, the server 102 may directly searching the service database using the keywords to obtain the service products with service keywords matching the keywords from the user (i.e., the candidate service products). In certain embodiments, the server 102 may use the keyword inputted by the user to search the service item database to obtain one or more service items matching the keywords as to obtain one or more candidate service item identifiers, and the candidate service item identifiers may be used to search the service database to obtain service products having the same service item IDs as the candidate service item identifiers.

The user may also search by categories and services based on the service item IDs of the service products in the service database. For example, the user may click on the drop menu control 614 to see a list of service categories 616. For an individual service category that includes any sub-category, the sub-category may also be listed under the individual service category when the user clicks on the individual service category. Further, when an service category without any sub-category or a sub-category is clicked, a list of service items may be displayed for the user to select. After the user selects the service item, the server 102 may use the selected service item to search the service database (e.g., using the service item identifier of the selected service item as the candidate service item identifier). That is, the search term may be a pre-defined term corresponding to the selected category, sub-category, or service item.

Returning to FIG. 3, after the service database is searched based on the search term, the results of the searching (or the candidate service products) may be displayed to the user on the user terminal (S308). That is, based on the results of the searching, e.g., the obtained candidate service products from the service database, the server 102 may display or cause the display of the obtained service products in a certain way to facilitate the user to consider and select any desired service products. For example, the server 102 may sort the obtained service products first before displaying the service products to the user.

In one embodiment, the server 102 may sort the obtained service products based on one or more service dimensions. For example, the server 102 may sort the service products based on review ranking scores, location proximity, available time, and/or cost of the service products. The server 102 may also obtain an intermediate score for each of the obtained service products and use the intermediate scores for sorting the service products. For example, the server 102 may determine a quality/cost ratio of each service products and sort the service products based on the value of the quality/cost ratios. The quality/cost ratio may be measured as the review ranking score divided by the cost of an individual service products. Further, a location dimension may also be used as an additional or separate parameter to sort the service products (e.g., the closer to the user, the higher score). In addition, the user may indicate one or more criteria to sort and display the obtained service products. For example, the user may use time and/or name of the service provider to sort the service products.

After the obtained service products are sorted, the server 102 may cause the sorted service products to be displayed on the user terminal for the user. Further, the user may select a service from the displayed services to obtain the selected service (S310). For example, the user may click on a desired service product to see more detailed information on the service products as well as how to obtain the service products. The user may then select the desired service product for service provision. In certain embodiments, the selected service product is an assisted self-service or an online self-service, such as legal document preparation or certain document filing services, the user may obtain the service online without going through other processes. That is, the server 102 may perform service provision online following the purchase from the user. In certain other embodiments, the selected service product is provided by a service provider/attorney, an engagement process may be performed first to establish the service relationship before the service can be provided by the service provider.

More specifically, when a service relationship (e.g., an attorney-client relationship) is required to be established first, the server 102 may perform an engagement process to start the provision of the selected service to the user (S312). For example, the server 102 may start a chat room application to initiate a chat session for the user and the service provider to complete any outstanding issues to establish the service relationship. Afterwards, the server 102 may provide service provision to both the service provider and the user to complete the service.

Various embodiments may further include a system for an online service provision platform to perform the disclosed methods. For example, the system may include one or more processors, configured to perform the disclosed methods in response to computer-executable instructions. In one embodiment, the system may include a server and a plurality of terminals to perform the disclosed methods. In another embodiment, the system may include an electronic device configured to perform the disclosed methods. In another embodiment, the system may include an electronic device configured to manage a server and a plurality of terminals to perform the disclosed methods.

In various embodiments, the electronic device (and/or the server/terminal) may be capable of automatically performing numerical calculation and/or information processing according to an instruction configured or stored in advance, and hardware of the electronic device (and/or the server/terminal) can include, but is not limited to, a microprocessor, an Application Specific Integrated Circuit (ASIC), a Field-Programmable Gate Array (FPGA), a Digital Signal Processor (DSP), and an embedded device, etc. The electronic device can be any electronic product that can interact with users, such as a personal computer, a tablet computer, a smart phone, a desktop computer, a notebook, a palmtop computer, a personal digital assistant (PDA), a game machine, an interactive network television (IPTV), and smart wearable devices, etc. The electronic device (and/or the server/terminal) can perform human-computer interaction with a user through a keyboard, a mouse, a remote controller, a touch panel, or a voice control device. The electronic device (and/or the server/terminal) can also include a network device and/or a user device. The network device can include, but is not limited to, a cloud server, a single network server, a server group composed of a plurality of network servers, or a cloud computing system composed of a plurality of hosts or network servers. The electronic device (and/or the server/terminal) can be in a network. The network can include, but is not limited to, the Internet, a wide region network, a metropolitan region network, a local region network, a virtual private network (VPN), and the like.

By using the disclosed methods and systems, an intelligent online service provision platform may be provided. The online service platform may use the improved digitization and searching mechanisms to facilitate online provision of services such that the speed, accuracy, and efficiency of service provision may be achieved.

What is claimed is:

1. A method for an online service provision platform, comprising:

establishing a service item database, the service item database comprising a pre-stored service item file, a service item file received from a user, and a service item real-time requested by a user;

establishing a service product database by inputting a plurality of digital service products into the service product database, the service product database being different from the service item database and each digital service product corresponding to a service item identifier, wherein the service item identifier uniquely identifies a service item from the service item database and contains a plurality of fields including a category field, one or more sub-category fields, and a service item field, wherein each digital service product comprises multiple service dimensions, the multiple service dimensions at least including:

a service scope dimension defining a specific scope, degree, or type for modifying the digital service product represented by the service item;

obtaining a search term from a user;

searching the service product database based on the search term to obtain a plurality of candidate service products;

displaying the candidate service products to the user to obtain a selected service product chosen from the candidate service products by the user; and performing a service provision process of the selected service product.

2. The method according to claim 1, wherein
the plurality of fields included in the service item identifier further include one or more sub-item fields;
the service item identifier is a data structure with a fixed bit length represented as category.sub-category[n].service item.sub-item[m], n and m being integers;
the data structure of the service item identifier is a 64-bit length number; and
the category field has a bit length of 8 bits, the sub-category field has a bit length of 24 bits, the service item has a bit length of 16 bits, and the sub-item field has a bit length of 16 bits.

3. The method according to claim 1, wherein the searching the service product database further includes:
searching the service item database using the search term to obtain at least one candidate service item identifier; and
searching the service product database using the at least one candidate service item identifier to obtain the plurality of candidate service products.

4. The method according to claim 1, wherein each digital service product further includes a digital service product identifier and the multiple service dimensions further include:
a service provider dimension including information regarding one or more service providers,
a time dimension including a time amount indicating time to be billed, and/or
a location dimension including location information of the digital service product, and location information of a service provider and a user, related to the digital service product.

5. The method according to claim 4, wherein the displaying the candidate service products to the user further includes:
sorting the candidate service products based on one or more of the service dimensions; and
displaying the sorted candidate service products.

6. The method according to claim 5, wherein the sorting the candidate service products further includes:
calculating an intermediate score of each of the candidate service products using two service dimensions of the candidate service products; and
sorting the candidate service products based on the intermediate score of each of the candidate service products.

7. The method according to claim 1, wherein performing the service provision process of the selected service product comprises:
performing an engagement process to establish a service relationship before the service provider starts the selected service product, and
providing the service provision process to both the service provider and the user to complete the service.

8. A non-transitory computer-readable storage medium containing computer-executable instructions for, when executed by one or more processors, performing a method for an online service provision platform containing a server and a plurality of terminals, the method comprising:
establishing a service item database, the service item database comprising a pre-stored service item file, a service item file received from a user, and a service item real-time requested by a user;
establishing a service product database by inputting a plurality of digital service products into the service product database, the service product database being different from the service item database and each digital service product corresponding to a service item identifier, wherein the service item identifier uniquely identifies a service item from the service item database and contains a plurality of fields including a category field, one or more sub-category fields, and a service item field,
wherein each digital service product comprises multiple service dimensions, the multiple service dimensions at least including:
a service scope dimension defining a specific scope, degree, or type for modifying the digital service product represented by the service item;
obtaining a search term from a user;
searching the service product database based on the search term to obtain a plurality of candidate service products;
displaying the candidate service products to the user to obtain a selected service product chosen from the candidate service products by the user; and
performing a service provision process of the selected service product.

9. The non-transitory computer-readable storage medium according to claim 8, wherein the plurality of fields further include one or more sub-item fields.

10. The non-transitory computer-readable storage medium according to claim 9, wherein the service item identifier is a data structure with a fixed bit length represented as category.sub-category[n].service item.sub-item[m], n and m being integers.

11. The non-transitory computer-readable storage medium according to claim 10, wherein the data structure of the service item identifier is a 64-bit length number.

12. The non-transitory computer-readable storage medium according to claim 11, wherein the category field has a bit length of 8 bits, the sub-category field has a bit length of 24 bits, the service item has a bit length of 16 bits, and the sub-item field has a bit length of 16 bits.

13. The non-transitory computer-readable storage medium according to claim 8, wherein:
the searching the service product database further includes:
searching the service item database using the search term to obtain at least one candidate service item identifier; and
searching the service product database using the at least one candidate service item identifier to obtain the plurality of candidate service products.

14. The non-transitory computer-readable storage medium according to claim 8, wherein each digital service product further includes a digital service product identifier and
the multiple service dimensions further include:
a service provider dimension including information regarding one or more service providers,
a time dimension including a time amount indicating time to be billed, and/or
a location dimension including location information of the digital service product, and location information of a service provider and a user, related to the digital service product.

15. The non-transitory computer-readable storage medium according to claim 14, wherein the displaying the candidate service products to the user further includes:
sorting the candidate service products based on one or more of the service dimensions; and
displaying the sorted candidate service products.

16. The non-transitory computer-readable storage medium according to claim 15, wherein the sorting the candidate service products further includes:
   calculating an intermediate score of each of the candidate service products using two service dimensions of the candidate service products; and
   sorting the candidate service products based on the intermediate score of each of the candidate service products.

17. A system for an online service provision platform, comprising:
   one or more processors, configured to, in response to computer-executable instructions:
   establish a service item database, the service item database comprising a pre-stored service item file, a service item file received from a user, and a service item real-time requested by a user;
   establish a service product database by inputting a plurality of digital service products into the service product database, the service product database being different from the service item database and each digital service product corresponding to a service item identifier, wherein the service item identifier uniquely identifies a service item from the service item database and contains a plurality of fields including a category field, one or more sub-category fields, and a service item field,
   wherein each digital service product comprises multiple service dimensions, the multiple service dimensions at least including:
      a service scope dimension defining a specific scope, degree, or type for modifying the digital service product represented by the service item;
   obtain a search term from a user;
   search the service product database based on the search term to obtain a plurality of candidate service products;
   display the candidate service products to the user to obtain a selected service product chosen from the candidate service products by the user; and
   perform a service provision process of the selected service product.

* * * * *